(12) United States Patent
Frankel et al.

(10) Patent No.: US 12,265,252 B2
(45) Date of Patent: Apr. 1, 2025

(54) RESONANT DEVICE IMPROVEMENT IN PICs USING SPARE DEVICES TO REDUCE POWER REQUIREMENTS

(71) Applicant: Ciena Corporation, Hanover, MD (US)

(72) Inventors: Michael Y. Frankel, Bethesda, MD (US); Vladimir Pelekhaty, Baltimore, MD (US); Sadok Aouini, Gatineau (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/463,865

(22) Filed: Sep. 1, 2021

(65) Prior Publication Data

US 2022/0075114 A1 Mar. 10, 2022

Related U.S. Application Data

(60) Provisional application No. 63/074,801, filed on Sep. 4, 2020.

(51) Int. Cl.
*G02B 6/12* (2006.01)
*G02B 6/293* (2006.01)
*G02F 1/01* (2006.01)

(52) U.S. Cl.
CPC ..... *G02B 6/12007* (2013.01); *G02B 6/29343* (2013.01); *G02B 6/29382* (2013.01);
(Continued)

(58) Field of Classification Search
CPC ............ G02B 6/12007; G02B 6/29343; G02B 6/29382; G02B 6/29395; G02F 1/0147; G02F 2203/15
See application file for complete search history.

(56) References Cited

U.S. PATENT DOCUMENTS 7,058,258 B2 * 6/2006 Yamazaki .......... G02B 6/12007
385/27
7,245,801 B2 * 7/2007 Boyd ..................... G02B 6/136
385/27
(Continued)

FOREIGN PATENT DOCUMENTS

CA       2257495 C    12/1997

OTHER PUBLICATIONS

L. Zhou et al., "Silicon electro-optics switches using microring resonators with phase-tunable feedback," in proceedings of IEEE/LEOS 3rd International Conference on Group IV Photonics, Ottawa, Canada, Sep. 13-15, 2006, pp. 243-245.

(Continued)

*Primary Examiner* — Ryan A Lepisto
(74) *Attorney, Agent, or Firm* — Baratta Law PLLC; Lawrence A. Baratta, Jr.

(57) ABSTRACT

A Photonic Integrated Circuit (PIC) includes N Ring and Disk type Microstructures (RDMs), N is an integer and greater than 1; at least one spare RDM, wherein each RDM operates spectrally in a periodic nature and has its spectral operation vary by temperature; and circuitry configured to handoff any of the N RDMs and the at least one spare RDM for spectral operation based on a current temperature. For the handoff, the at least one spare RDM is unlocked spectrally and is tuned and locked to a frequency of interest of a current RDM based on the temperature, and the current RDM is unlocked.

14 Claims, 11 Drawing Sheets

(52) U.S. Cl.
CPC ....... G02B 6/29395 (2013.01); G02F 1/0147 (2013.01); *G02F 2203/15* (2013.01)

(56) References Cited

U.S. PATENT DOCUMENTS

| | | | |
|---|---|---|---|
| 7,342,712 B2 | 3/2008 | Pelekhaty | |
| 7,343,101 B1 | 3/2008 | Frankel et al. | |
| 7,454,101 B2* | 11/2008 | Jones | H04B 10/25133 385/27 |
| 7,634,194 B2 | 12/2009 | Frankel et al. | |
| 7,801,446 B2* | 9/2010 | Little | G02B 6/29395 398/83 |
| 8,519,803 B2* | 8/2013 | McLaren | H01P 1/2084 359/332 |
| 8,625,936 B1* | 1/2014 | Dong | G02F 1/2257 385/32 |
| 8,660,390 B2* | 2/2014 | McLaren | G02B 6/12007 385/50 |
| 8,909,000 B2* | 12/2014 | Meade | G02B 6/122 385/24 |
| 9,007,921 B2 | 4/2015 | Pelekhaty et al. | |
| 9,164,300 B2* | 10/2015 | Bernasconi | H05K 13/04 |
| 9,348,154 B2* | 5/2016 | Hayakawa | G02F 1/225 |
| 9,374,166 B2 | 6/2016 | Mateosky et al. | |
| 9,389,365 B2* | 7/2016 | Nicholson | G02B 6/29341 |
| 9,436,019 B1 | 9/2016 | Pelekhaty et al. | |
| 9,551,836 B2 | 1/2017 | Frankel et al. | |
| 9,748,738 B2* | 8/2017 | Krishnamoorthy | H01S 5/1096 |
| 9,793,984 B2 | 10/2017 | Sinclair et al. | |
| 9,906,306 B2* | 2/2018 | Shimizu | H04J 14/0295 |
| 9,941,973 B2 | 4/2018 | Simard et al. | |
| 9,991,966 B1* | 6/2018 | Celo | G02F 1/011 |
| 10,075,245 B2* | 9/2018 | Caplan | H04B 10/671 |
| 10,194,221 B2 | 1/2019 | Frankel et al. | |
| 10,200,145 B2 | 2/2019 | Boertjes et al. | |
| 10,239,749 B2 | 3/2019 | Frankel et al. | |
| 10,297,981 B2* | 5/2019 | Bovington | H01S 5/1028 |
| 10,313,021 B1 | 6/2019 | Frankel et al. | |
| 10,330,959 B2* | 6/2019 | Wen | G02F 1/011 |
| 10,374,699 B2* | 8/2019 | Ji | H04Q 11/00 |
| 10,488,588 B1* | 11/2019 | Seyedi | G02B 6/12007 |
| 10,727,640 B2* | 7/2020 | Sun | H01S 5/1246 |
| 10,809,592 B2* | 10/2020 | Dutt | G02F 1/313 |
| 10,826,514 B1 | 11/2020 | Honarparvar et al. | |
| 11,012,081 B2 | 5/2021 | Parvizi et al. | |
| 2006/0127086 A1 | 6/2006 | Frankel | |
| 2008/0193113 A1* | 8/2008 | Yeom | A45C 11/38 348/E5.026 |
| 2012/0057866 A1 | 3/2012 | McLaren et al. | |
| 2014/0314406 A1* | 10/2014 | Zerbe | H04J 14/0221 250/208.2 |
| 2017/0090267 A1 | 3/2017 | O'Sullivan | |
| 2017/0090268 A1 | 3/2017 | O'Sullivan | |
| 2017/0214472 A1 | 7/2017 | Caplan et al. | |

OTHER PUBLICATIONS

M. Popović et al., "Transparent wavelength switching of resonant filters," in Conference on Lasers and Electro-Optics/Quantum Electronics and Laser Science Conference and Photonic Applications Systems Technologies, OSA Technical Digest Series (CD) (Optical Society of America, 2007), paper CPDA2, pp. 1-2.

C. Li et al., "Silicon microring carrier-injection-based modulators/switches with tunable extinction ratios and OR-logic switching by using waveguide cross-coupling," Opt. Express, 15(8), pp. 5069-5076 (2007).

S. Darmawan et al., "Nested ring Mach-Zehnder interferometer," Opt. Express 15, pp. 437-448 (2007).

J. Hong et al., "Modeling and analysis of microring resonator modulators with feedback waveguide coupling," J. Lightw. Technol., vol. 29, No. 21, pp. 3243-3249, Dec. 2011.

D. Adams et al., "Robust phase-shift keying silicon photonic modulator," Opt. Express, vol. 20, No. 16, pp. 17440-17447, 2012.

B. Song et al., "Single ring resonator QPSK modulator," CLEO 2015, SW1N1.1, pp. 1-2.

G. Zhao et al., "Tunable Fano resonances based on microring resonator with feedback coupled waveguide," Opt. Exp., vol. 24, No. 18, pp. 20187-20195, Sep. 2016.

H. Shoman et al., "Compact Silicon Microring Modulator with Tunable Extinction Ratio and Wide FSR," Optical Fiber Communication Conference (Optical Society of America), 2018, Paper Tu2E-1.

S. Wan et al., "Experimental demonstration of dissipative sensing in a self-interference microring resonator," Photon. Res. vol. 6, No. 7, Jul. 2018, pp. 681-685.

D. Liang et al., "A Tunable Hybrid III-V-on-Si MOS Microring Resonator with Negligible Tuning Power Consumption," Optical Fiber Comm. Conference, OFC 2016, Paper Th1K.4.

A. Poon et al., "Microring and microdisk resonator-based devices for on-chip optical interconnects, particle manipulation and biosensing," Invited Paper, Proc. of SPIE vol. 7913, 2011, pp. 791313-1-791313-16.

L. Zhou et al., "Electrically reconfigurable silicon microring resonator-based filter with waveguide-coupled feedback," OSA, Jul. 23, 2007, vol. 15, No. 15, Optics Express, pp. 9194-9204.

Jun. 21, 2022, International Search Report and Written Opinion issued for International Patent Application No. PCT/US2021/049002.

* cited by examiner

1. 'Active' Ring EO control stabilizes within ~ 1 channel spacing
2. 'Spare' ring approaches nearest channel since NOT stabilized
3. 'Spare' ring becomes 'Active'
4. Previous 'Active' becomes 'Spare' and process cascades across all channels

RESONANT DEVICE IMPROVEMENT IN PICs USING SPARE DEVICES TO REDUCE POWER REQUIREMENTS

CROSS-REFERENCE TO RELATED APPLICATIONS

The present disclosure claims priority to U.S. Provisional Patent Application No. 63/074,801, filed Sep. 4, 2020, the contents of which are incorporated by reference in their entirety.

STATEMENT REGARDING FEDERALLY SPONSORED RESEARCH OR DEVELOPMENT

This invention was made with government support under Contract #HR0011-19-C-0083, Subaward #KK2005, awarded by DARPA. The government has certain rights in the invention.

FIELD OF THE DISCLOSURE

The present disclosure generally relates to optical networking. More particularly, the present disclosure relates to systems and methods for resonant device improvement in Photonic Integrated Circuits (PICs) using spare devices to reduce power requirements.

BACKGROUND OF THE DISCLOSURE

A Photonic Integrated Circuit (PIC) or integrated optical circuit is a device that integrates multiple (at least two) photonic functions and, as such, is similar to an electronic integrated circuit. The major difference between the two is that a PIC provides functions for information signals imposed on optical wavelengths. Ring and Disk type Microstructures (RDM) are resonant devices and provide extremely efficient ways to implement modulation and wavelength filtering in PICs. On the Transmitter modulation side, RDMs can be efficiently driven by very low voltage signals to provide Amplitude and/or Phase modulation. On the receiver demultiplexer filter side, they provide highly selective filtering functions, with tunability implemented via thermal effects or electro-optic effects. However, since RDMs are resonant, they are extremely sensitive to temperature and require active spectral stabilization. For example, Si Photonic platform based RDMs have a sensitivity of 1 deg C. giving ~–10 GHz of deviation. Active thermal stabilization is implemented by incorporating microheaters at each RDM and maintaining their temperature at just above the maximum that can be expected for the operating environment.

A typical environmental range may be specified to cover 60 deg C., and an RDM would have to be heated by corresponding 60 deg C. under worst-case environmental conditions. Typical microheater efficiency is ~0.02 mW/deg C., which may seem insignificant. However, it produces 1.2 mW power consumption under worst-case conditions, resulting in an effective 50 fJ/bit power at 25 Gbps data rate. Power targets for co-packaged ultra-dense optical Input-Output (IO) for high-performance Application-Specific Integrated Circuits (ASICs) are specified at a total of 100 fJ/bit, which includes lasers, Serializer-De-serializer (SERDES), drivers, Transimpedance Amplifier (TIA), decoders, etc. Therefore, spending 50% of power on RDM stabilization uses up ALL of the electrical power budget, i.e., 50% on RDM modulator and 50% on RDM receiver drop filter. That is, the conventional approach is to heat RDM devices to worst-case environmental conditions and lock the frequencies at this temperature. This operational approach requires significant and wasted power.

What is needed is an approach for substantially reducing RDM stabilization power at the worst-case environmental temperature condition, for optical IO.

BRIEF SUMMARY OF THE DISCLOSURE

The present disclosure relates to systems and methods for resonant device improvement in Photonic Integrated Circuits (PICs) using spare devices to reduce power requirements. The approach described herein can be used for optical IO, such as PICs as co-packaged IO with electrical circuits, e.g., ASICs, FPGAs, etc. Specifically, the approach described herein utilizes a plurality of RDM devices including a spare RDM device along with a handoff procedure between the plurality of RDM devices. The present disclosure utilizes electro-optic tuning instead of heaters. Of note, the tuning has a limited range, but this limitation is addressed with the spare RDM device. The RDM devices are periodic supporting various resonant frequencies. The RDM devices including the spare device may be used and locked to support different frequencies based on the operating temperature. The purpose of the spare RDM is to allow coverage with the limited tuning range of the electro-optic approach. A limited tuning range is quite sufficient for this application. Therefore, intrinsic tuning RDM power consumption can be reduced to virtually ZERO, not accounting for control electronics.

In an embodiment, a Photonic Integrated Circuit (PIC) includes N Ring and Disk type Microstructures (RDMs), N is an integer and greater than 1; at least one spare RDM, wherein each RDM operates spectrally in a periodic nature and has its spectral operation vary by temperature; and circuitry configured to handoff any of the N RDMs and the at least one spare RDM for spectral operation based on a current temperature. For the handoff, the at least one spare RDM is unlocked spectrally and is tuned and locked to a frequency of interest of a current RDM based on the temperature, and the current RDM is unlocked.

The circuitry configured to handoff can operate in-service. The N RDMs and the at least one spare RDMs can be drop filters for a receiver. The circuitry configured to handoff can include a summation circuit that sums currents of any two RDMs being in the handoff. The N RDMs and the at least one spare RDMs can be modulators for a transmitter. The circuitry configured to handoff can include a coupler that has its coupling coefficients modified during the handoff following prescribed trajectories. The PIC can further include circuitry configured to implement electro-optic tuning. The PIC can be integrated with another circuit for optical Input/Output (IO). Each of the RDMs can have a free spectral range greater than the spectral operation.

In another embodiment, a method of handoff for Ring and Disk type Microstructure (RDM) spectral operation includes steps of operating N Ring and Disk type Microstructures (RDMs), N is an integer and greater than 1 and at least one spare RDM at a first temperature, wherein each RDM operates spectrally in a periodic nature and has its spectral operation vary by temperature; and, responsive to a second temperature, handing off the spectral operation of any of the N RDMs and the at least one spare RDM. The handing off can include unlocking spectrally the at least one spare RDM;

tuning and locking the at least one spare RDM to a frequency of interest of a current RDM; and unlocking spectrally the current RDM.

The handing off can be in-service. The N RDMs and the at least one spare RDMs can be drop filters for a receiver. The handing off can include summing currents of any two RDMs being in the handing off. The N RDMs and the at least one spare RDMs can be modulators for a transmitter. The handing off can include modifying coupling coefficients following prescribed trajectories. The handing off can include electro-optic tuning. The N RDMs and at least one spare RDM can be integrated with another circuit for optical Input/Output (IO). Each of the RDMs can have a free spectral range greater than the spectral operation.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for resonant device improvement in Photonic Integrated Circuits (PICs) using spare devices to reduce power requirements. The approach described herein can be used for optical IO, such as PICs as co-packaged IO with electrical circuits, e.g., ASICs, FPGAs, etc. Specifically, the approach described herein utilizes a plurality of RDM devices including a spare RDM device along with a handoff procedure between the plurality of RDM devices. The present disclosure utilizes electro-optic tuning instead of heaters. Of note, the tuning has a limited range, but this limitation is addressed with the spare RDM device. The RDM devices are periodic supporting various resonant frequencies. The RDM devices including the spare device may be used and locked to support different frequencies based on the operating temperature. The purpose of the spare RDM is to allow coverage with the limited tuning range of the electro-optic approach. A limited tuning range is quite sufficient for this application. Therefore, intrinsic tuning ring power consumption can be reduced to virtually zero, not accounting for control electronics.

Receiver-Side Channel Drop Filter Configuration

Figure 1A:
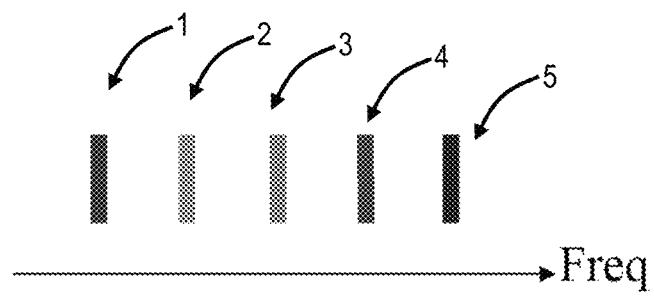
FIG. 1A is a diagram of five example channels at different frequencies.
Figure 1B:
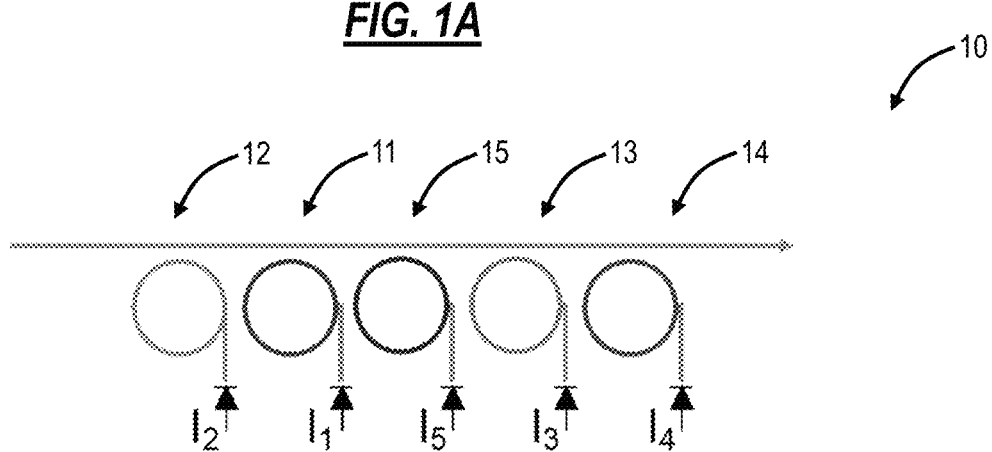
FIG. 1B is a diagram of five example drop filter rings with individual photocurrent representing the detected signals.

FIG. 1A is a diagram of five example channels at different frequencies and FIG. 1B is a diagram of a PIC system 10 with an example including 5 drop filter rings 11, 12, 13, 14, 15 with individual photocurrent representing detected modulation signals. FIG. 1B is a typical system 10 configuration, illustrated as a serial sequence of ring-based drop filters with 5 wavelengths 1, 2, 3, 4, 5. RDMs provide sequential drop to individual channels, as indicated by elements 1, 2, 3, 4, 5. Note that RDM manufacturing spread, and different temperatures make the exact sequence in which channels are dropped most efficiently unpredictable (i.e., quasi-random). This randomness in channel drop sequence necessitates a crossbar function between dropped signals and electrical data outputs. For example, FIG. 1B illustrates a drop sequence of wavelengths 2, 1, 5, 3, 4, from drop filter rings 12, 11, 15, 13, 14.

Those skilled in the art will recognize FIGS. 1A and 1B are presented for illustration purposes, and other embodiments for a PIC 10 with RDMs, including more or fewer rings, are also contemplated. In FIG. 1A, the resonances for the same frequencies are periodic, that is, the resonances for each of 5 wavelengths 1, 2, 3, 4, 5 repeat periodically to the left and the right (not shown). The frequency spacing can be 25 GHz, 50 GHz, 100 GHz, etc. The channels can have various modulation formats and data rates, such as NRZ modulated at 25 Gb/s or Pulse Amplitude Modulated-4 (PAM-4) at 50 Gb/s, etc. There is generally a tradeoff between the number of wavelengths and the channel spacing. There can be hundreds of channels, such as at 10 Gb/s.

That is, those skilled in the art will recognize the 5-channel example presented herein using NRZ modulation is merely for illustration purposes and practical embodiments could have hundreds of channels and different modulation formats.

In a conventional system, all the rings 11, 12, 13, 14, 15 have to be heated to at least the highest temperature expected to be seen on a PIC wafer in operation plus an additional offset to align a specific RDM resonance peak to the desired channel. This may be greater than 60 deg C. plus at worst-case of what would be needed to cover the manufacturing spread between rings 11, 12, 13, 14, 15. This results in unacceptably large electrical power consumption for the PIC. In a case of manufacturing uncertainty equivalent to 100 GHz, additional heating of 10 deg C. would be required on some RDMs, for a total of 70 deg C.

Figure 2A:
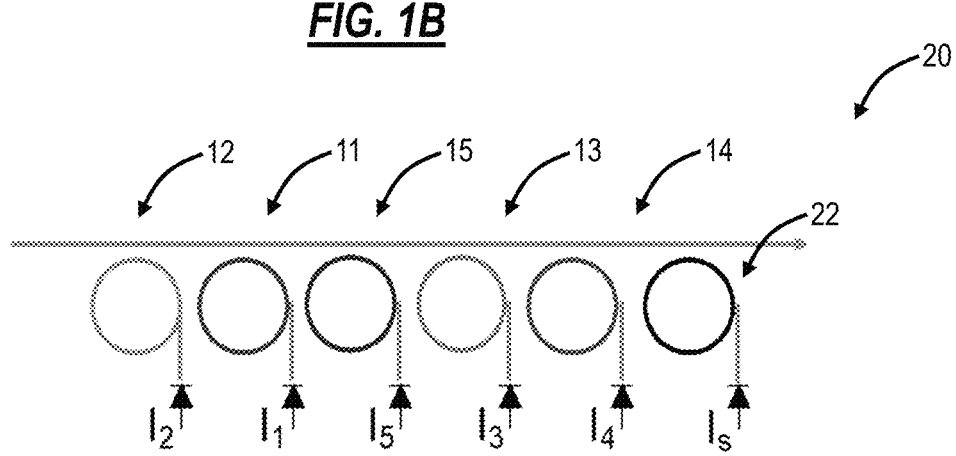
FIG. 2A is a diagram of a PIC system with the addition of a spare drop ring, in addition to the example with five drop filter rings, as shown in FIG. 1B.

FIG. 2A is a diagram of a PIC system 20 with the addition of a spare drop ring filter 22, in addition to the five example drop filter rings 11, 12, 13, 14, 15. The present disclosure includes modifications to the structure and operation of the system 10, namely the system 20 includes an additional spare RDM drop ring filter 22. Of note, the RDMs are used both on the transmit side as ring modulators and on the receive side as drop filters. The spare RDM is used in both configurations. The following description focuses on the drop filter configuration, and the ring modulator is described later.

Figure 2B:
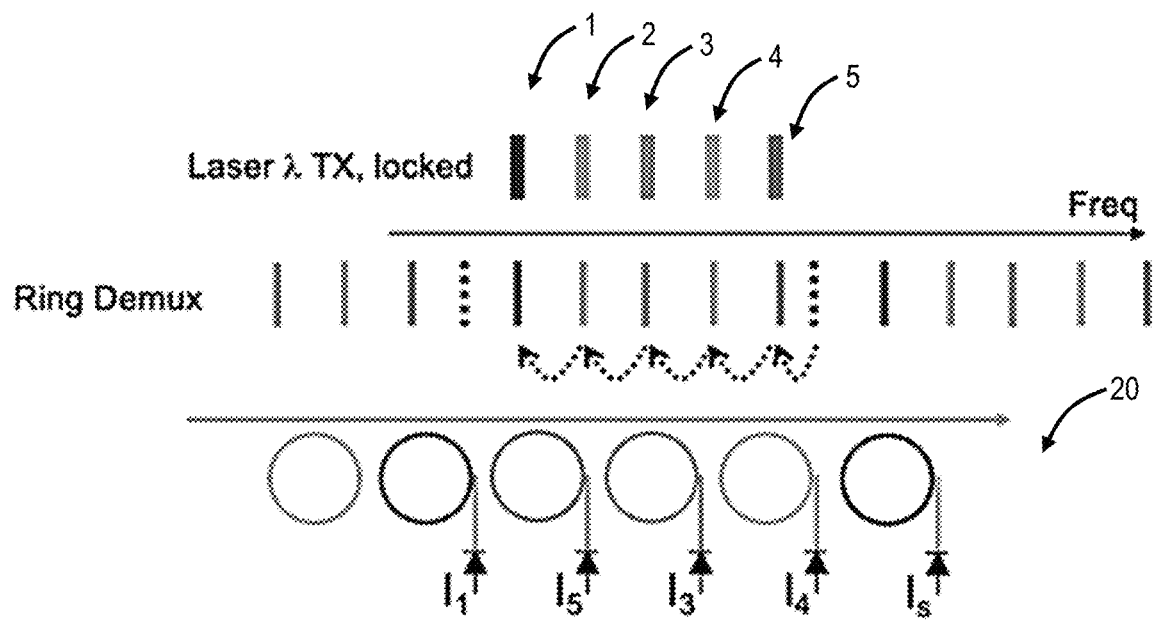
FIG. 2B is a diagram of the PIC system and a diagram of five example channels at different frequencies.
Figure 2C:
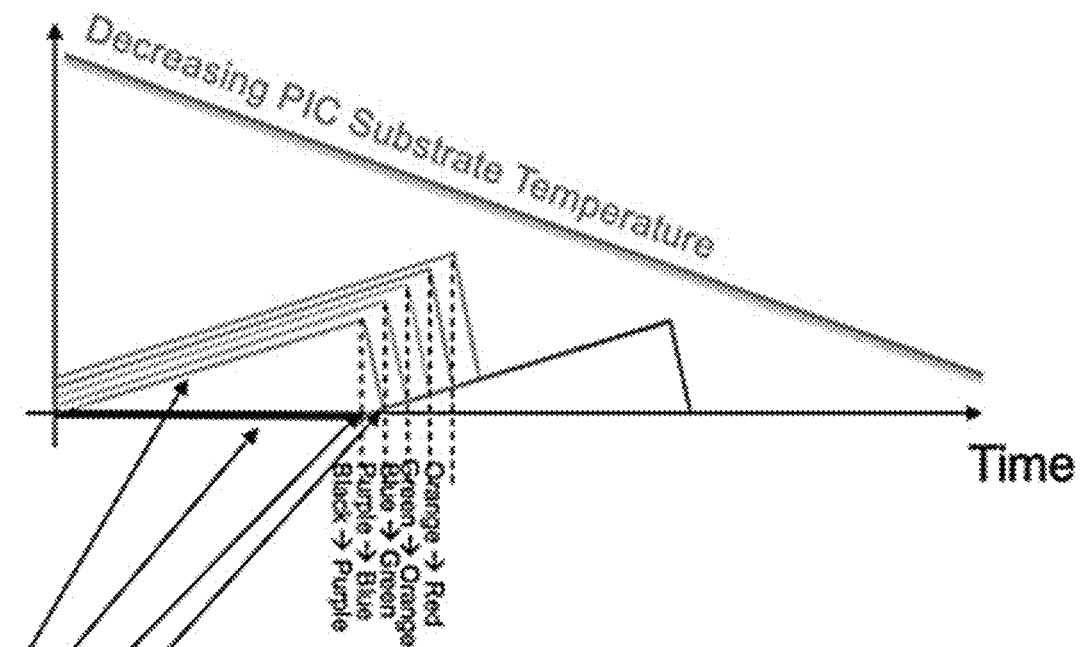
FIG. 2C is a graph of time versus decreasing temperature and example ring handoffs.

FIG. 2B is a diagram of the PIC system 20 and a diagram of five example channels at different frequencies. FIG. 2C is a graph of time versus decreasing temperature and example ring handoffs. In FIG. 2B, example operation of the spare drop ring filter 22 is described. Note, FIG. 2B illustrates the periodic frequency operation, and with this periodic frequency operation, the spare drop ring filter 22 enables minor tuning using electro-optic tuning which can have a tuning ability of around 100 GHz with a tune ring resonance of about 80 fW/10 GHz.

In this example, the 5 wavelengths 1, 2, 3, 4, 5 are spaced about 100 GHz apart (about 6 nm), and the RDMs have a tuning rate of about 0.06 nm/deg. C., meaning about 10 deg C. is needed to move the 5 wavelengths 1, 2, 3, 4, 5 one way or the other on the spectrum. The present disclosure contemplates a graceful, cascade tuning process where one of the RDMs takes over for its adjacent RDM, including the spare RDM.

Assume initial PIC state is at 80 deg C. When the system is initially calibrated and tuned, the baseline at the initial PIC temperature of 80 deg C. is kept, and a controlled offset sufficient to cover a single channel spacing of 100 GHz (10 deg C.) is introduced. Although present disclosure contemplates electro-optic tuning, other tuning mechanisms (thermo-optic, piezoelectrical, etc.) could also be used.

FIG. 2D illustrates the tuning process. As PIC temperature decreases, active RDMs are controlled to keep resonances locked. However, the spare RDM is not locked, and it moves towards an active channel, namely wavelength 5, in this example. As it moves towards the active wavelength 5, the spare RDM channel takes over for it and the previous RDM for the wavelength 5 is released (unlocked) for it to take over its neighbor, the wavelength 4. An electronic circuit is provided that sums $I_s + I_5$ ($I_s$=current from the spare drop ring filter 22 and $I_5$=current from the drop ring filter 15), giving total output equivalent to the wavelength 5, channel 15. As $I_5$ increases to the maximum, the drop ring filter 15 channel is stopped being controlled, releasing it to replace the next adjacent channel, e.g., the wavelength 4 with current $I_4$. This handoff procedure is performed in-service between the filter 15 and the spare filter 22, based on the circuit operation. This process repeats which is why it is referred to as a cascaded tuning process.

The present disclosure leverages the periodic nature of the RDMs along with adding the extra spare RDM so that the only tuning required is minimal, namely the electro-optic tuning.

It is important to note that this process is best achieved when RDM Free Spectral Range (FSR) is just larger than the total channel spectral coverage, i.e., FSR 500 GHz, in this example. Then, the next order RDM resonance is always nearby to continue the process of cascaded replacement. If PIC temperature starts increasing, RDM are controlled in the opposite direction, and the cascaded replacement process proceeds in reverse.

Figure 3A:
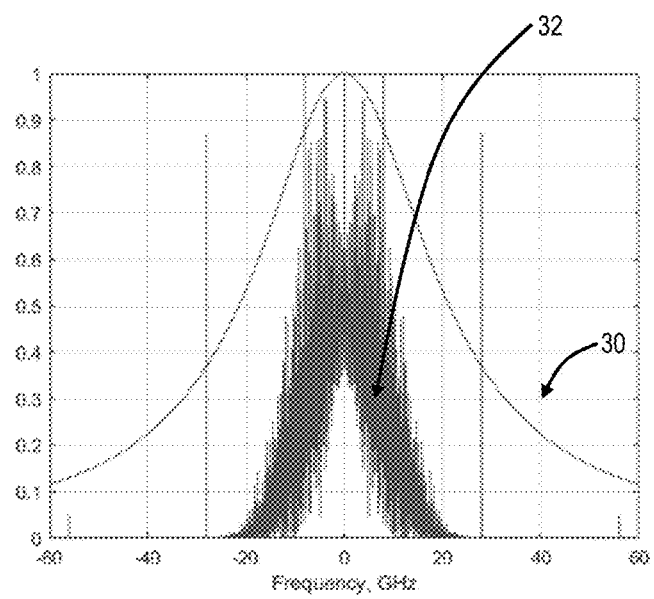
FIG. 3A is a graph of single-channel drop spectrum and NRZ signal spectrum.
Figure 3B:
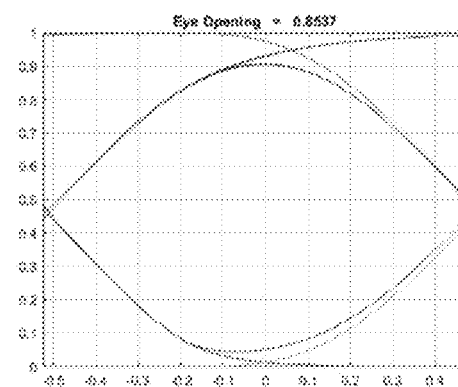
FIG. 3B is an eye diagram of output photocurrent.

FIG. 3A is a graph of single-channel drop spectrum (line 30) and NRZ signal spectrum (line 32), and FIG. 3B is an eye diagram of output photocurrent. FIGS. 3A and 3B model a 28 Gbps NRZ signal, and show NRZ signal spectrum and RDM drop spectrum (line 30), as well as the Eye diagram, via the system 20 for a drop ring filter. There is some residual Eye closure due to the RDM passband impact on the NRZ spectrum.

Figure 4A:
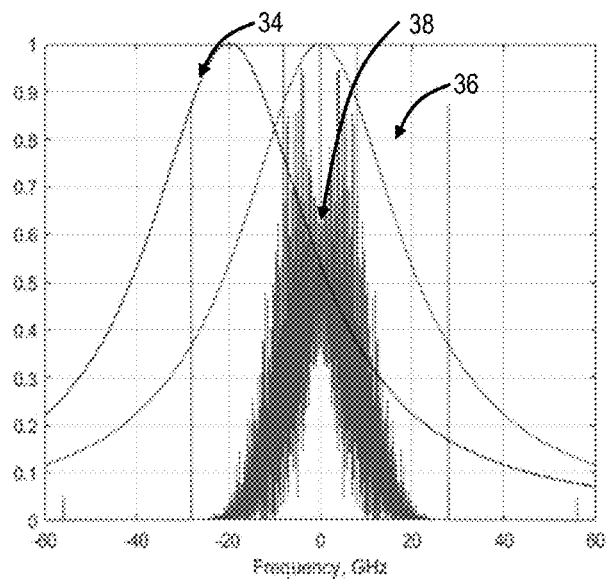
FIG. 4A is a graph of spare channel spectrum, original channel drop spectrum and Non-Return to Zero (NRZ) signal spectrum.
Figure 4B:
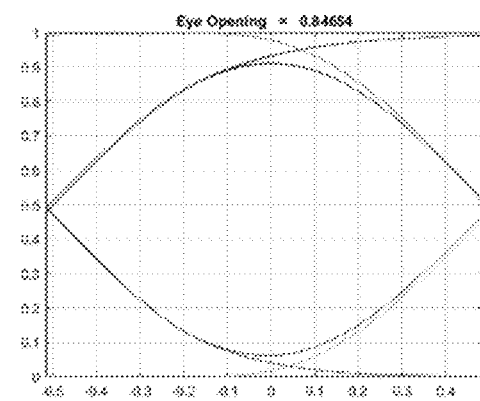
FIG. 4B is an eye diagram of output photocurrents from summed photocurrents.

FIG. 4A is a graph of spare (line 34) channel spectrum and original channel drop spectrum (line 36) and NRZ signal spectrum (line 38), and FIG. 4B is an eye diagram of output photocurrents from summed photocurrents. Next, a spare RDM (line 34) is tuned until it is ~20 GHz away from the center of the operating channel, as shown in FIG. 4A. The resulting Eye diagram is produced by adding photocurrents from the two RDM drop filters and is nearly indistinguishable from the original one. This confirms the proper dual-drop operation and validity of the RDM drop replacement procedure. Note: photocurrents may be taken directly from photodetectors (PD) or PD signal may go through TIA first, and then be converted to a current source by an intermediate circuit.

Several aspects need to be considered for proper operation:

Consider a case where a spare RDM resonance is between two active channels. If the spare RDM physically precedes both of the other active RDMs, then it will detect the residual component of the released channel. It should NOT be enabled for summation until this parasitic crosstalk component falls below a set threshold level. At the same time, it should be summed as soon as possible to prevent the degradation of the channel being replaced.

If a spare RDM physically follows after the released channel, there will be no significant crosstalk.

If a spare RDM physically follows after the channel being replaced, then a more sensitive mechanism to detect when it is properly centered in the channel being replaced will need to be implemented (since signal power will be mostly dropped before it gets to this RDM).

Figure 5A:
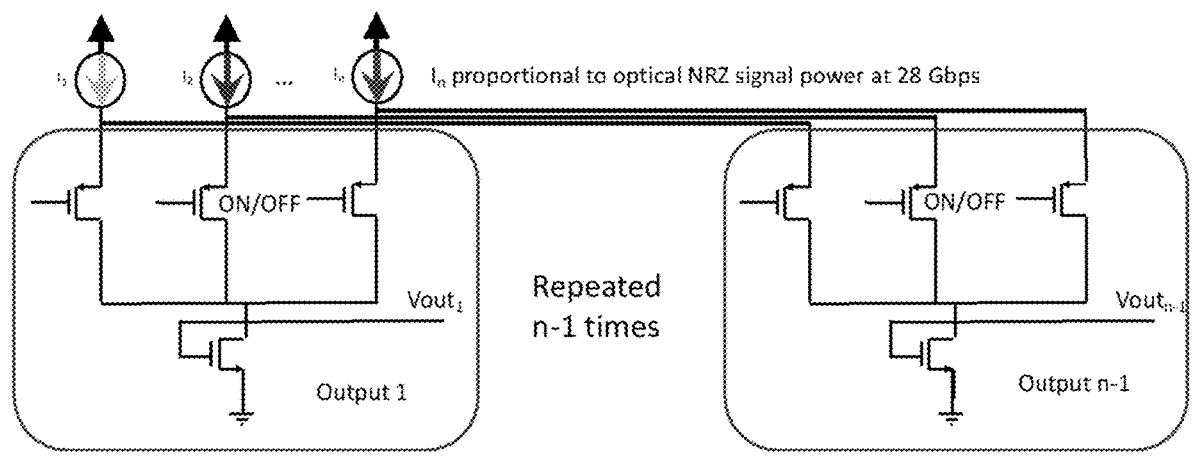
FIG. 5A is a diagram of a selective photocurrent summation circuit that connects to the system of FIG. 2.

FIG. 5A is a diagram of a selective photocurrent summation circuit that connects to the system 20. Signal summation requires that channels be time-aligned. Therefore, system time delays from each RDM up to the summation circuit node must be carefully matched or calibrated. A selectable channel photocurrent summation needs to be implemented, as well as a reconfigurable crossbar function such that any RDM output can be selectively directed to any required system output. This can be accomplished by the circuit in FIG. 5. Dropped optical signals from individual RDMs 1 to N are converted to corresponding currents, as represented by current sources $I_1$ to $I_n$. These are fanned out to summation circuit blocks, with one block per desired output Vout.

Top-level Complementary Metal-Oxide-Semiconductor (CMOS) transistors implement a current ON/OFF gate, such that a particular current $I_n$ is only enabled on a single summation circuit. Also, at any given time, each current source must be connected to a summation circuit (cannot be left floating), or alternatively a dummy load resistor can be introduced to sink otherwise any unconnected current source.

During RDM hand-off when two currents need to be added, both are enabled on a single corresponding summation circuit. (Note: there is 1 fewer outputs $V_{out}$ than input currents). An additional benefit of this circuit is that it also inherently implements a signal cross-bar switch function, such that any dropped wavelength signal can be directed to an arbitrarily selectable output, allowing to mitigate issues with RDM resonance randomization due to manufacturing imperfections.

Figure 5B:
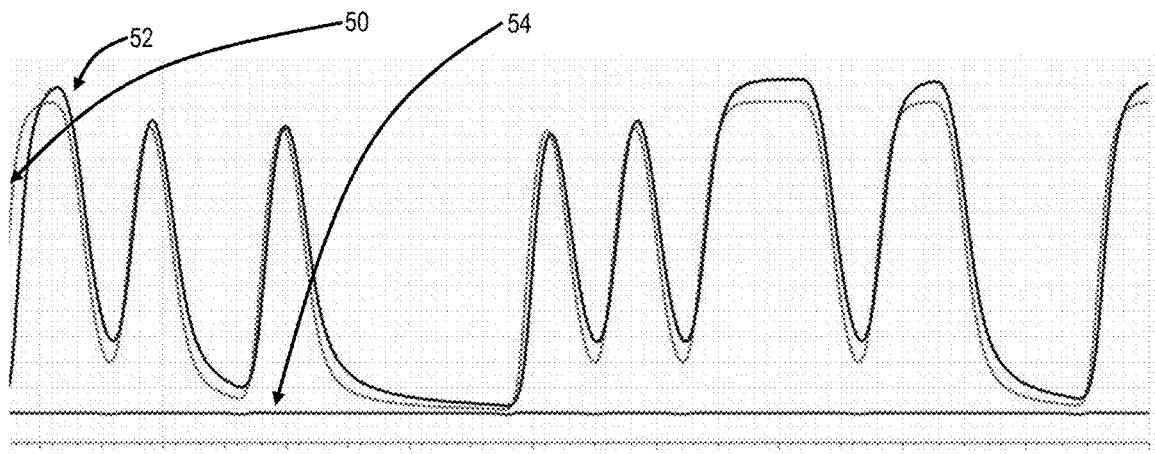
FIG. 5B is a graph of performance of selective photocurrent summation circuit with 28 Gbps raised cosine input current.

FIG. 5B is a graph of performance of selective photocurrent summation circuit with 28 Gbps raised cosine input current, line 50 is 100% of current in one channel selected for the designated output, line 52 is 50% of current in two channels summed into the same output, and line 54 is crosstalk into undesired output with selector OFF. FIG. 5B shows that selective photocurrent summation circuit performs equally well while selecting all input current into a single designated output (line 50) and summing 50%-50% split currents from two channels into a same designated output (line 52). Crosstalk in undesired output with selector OFF (flat horizontal line 54 at zero level) is virtually non-existent.

Transmitter-Side Modulator Configuration

Similar to the above description, which covered the receiver channel drop filter case, RDM based modulators can be implemented at the transmitter side. Overall tuning and graceful channel replacement work in a similar manner. Of course, rather than receiver photodetection, electro-optic RDM modulation is implemented. Driver circuits are provided, such that each active RDM is driven by appropriate data. The spare RDM is driven by a copy of the data channel that is being targeted for replacement.

Figure 6:
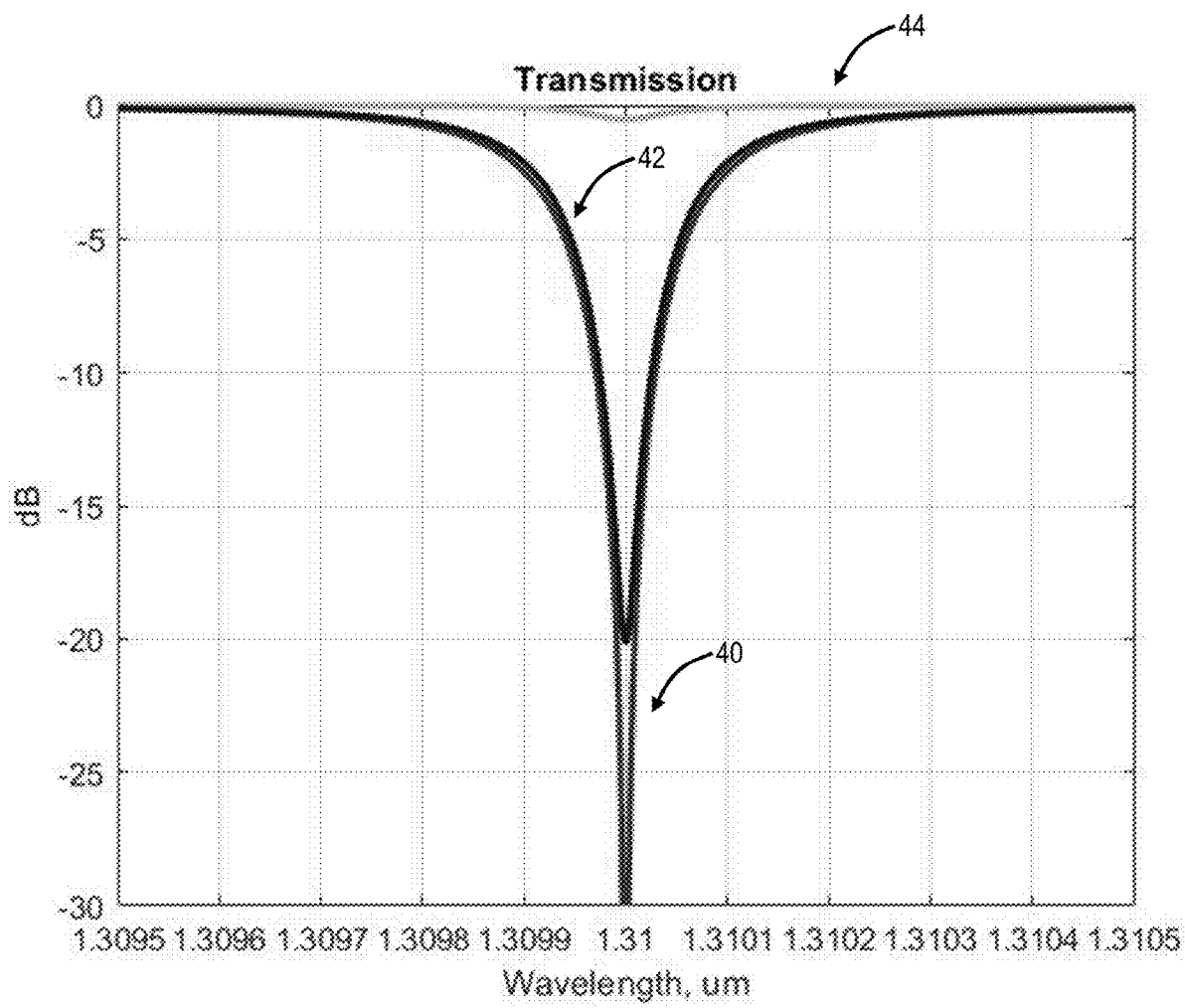
FIG. 6 is a diagram illustrating RDM transmission vs wavelength for critical coupling, slight under coupling and severe under coupling.

There exists a critical difference between drop filter and modulator RDM operation. Drop filter operates on a transmission null, and graceful hand-off between RDMs occurs naturally. However, modulators operate off-resonance and transitions through resonance null will disable the link. Therefore, RDM modulators require us to implement an optical 'disable' function, which is accomplished by controlling optical coupling as illustrated in FIG. 6 which is a graph of RDM transmission versus wavelength for critical coupling (line 40), slight under coupling (line 42) and severe under coupling (line 44).

Graceful modulator hand-off can be accomplished in the following manner: disable 'spare' modulator coupling; overlap spare modulator with active one spectrally; gradually enable 'spare' coupler and disable active, then spectrally shift former active modulator with disabled coupling.

Power transmission at the bottom of the resonance notch of RDM $T_{min}$ depends on the relation between the amplitude coupling coefficient k and amplitude round trip attenuation a:

$$T_{min} = \frac{\left(\sqrt{(1-k^2)}-a\right)^2}{\left(1-\sqrt{(1-k^2)}*a\right)^2}$$

It is minimal at zero for critically coupled resonator with $k=\sqrt{(1-a^2)}=0.189$ for a=0.982 (line 40), quite low at −20 dB for slightly under coupled resonator with k=0.171 (line 42) and less than −0.5 dB for very low coupling coefficient k=0.03 (line 44). Hence the resonator can be quite efficiently disabled by reducing coupling coefficient 6 times.

Tunable coupler can be implemented as four-port unbalanced Mach Zehnder Interferometer (MZI) with some example implementations illustrated in the following references [1-11], the contents of which are incorporated by reference in their entirety:

[1] L. Zhou and A. W. Poon, "Silicon electro-optics switches using microring resonators with phase-tunable feedback," in proceedings of IEEE/LEOS 3rd International Conference on Group IV Photonics, Ottawa, Canada, Sep. 13-15, 2006.

[2] M. A. Popović, T. Barwicz, F. Gan, M. S. Dahlem, C. W. Holzwarth, P. T. Rakich, H. I. Smith, E. P. Ippen, and F. X. Kärtner, "Transparent wavelength switching of resonant filters," in *Conference on Lasers and Electro-Optics/ Quantum Electronics and Laser Science Conference and Photonic Applications Systems Technologies*, OSA Technical Digest Series (CD) (Optical Society of America, 2007), paper CPDA2.

[3] Li, C., Zhou, L. and Poon, A. W., "Silicon microring carrier-injection-based modulators/switches with tunable extinction ratios and OR-logic switching by using waveguide cross-coupling," Opt. Express, 15(8), 5069-5076 (2007).

[4] S. Darmawan, Y. M. Landobasa, and M. K. Chin, "Nested ring Mach-Zehnder interferometer," Opt. Express 15, 437-448 (2007).

[5] Zhou, L. and Poon, A. W., "Electrically reconfigurable silicon microring resonator-based filter with waveguide-coupled feedback," Opt. Express, 15, 9194 (2007).

[6] J. Hong and Y. Enami, "Modeling and analysis of microring resonator modulators with feedback waveguide coupling," J. Lightw. Technol., vol. 29, no. 21, pp. 3243-3249, December 2011.

[7] D. Adams, A. Aboketaf, and S. Preble, "Robust phase-shift keying silicon photonic modulator," Opt. Express, vol. 20, no. 16, pp. 17440-17447, 2012.

[8] B. Song, L. Zhuang, C. Zhu, B. Corcoran, and A. Lowery. "Single ring resonator QPSK modulator," CLEO2015, SW1N1.1.

[9] G. Zhao et al., "Tunable Fano resonances based on microring resonator with feedback coupled waveguide," Opt. Exp., vol. 24, no. 18, pp. 20187-20195, September 2016.

[10] Shoman H A, Jayatilleka H, Park A, Jaeger N, Shekhar S and Chrostowski L 2018 Compact silicon microring modulator with tunable extinction ratio and wide fsr Optical Fiber Communication Conference (Optical Society of America) pp Tu2E-1.

[11] S. Wan, R. Niu, H.-L. Ren, C.-L. Zou, G.-C. Guo, and C.-H. Dong, "Experimental demonstration of dissipative sensing in a self-interference microring resonator," Photon. Res. 6, 681-685 (2018).

Figure 7A:
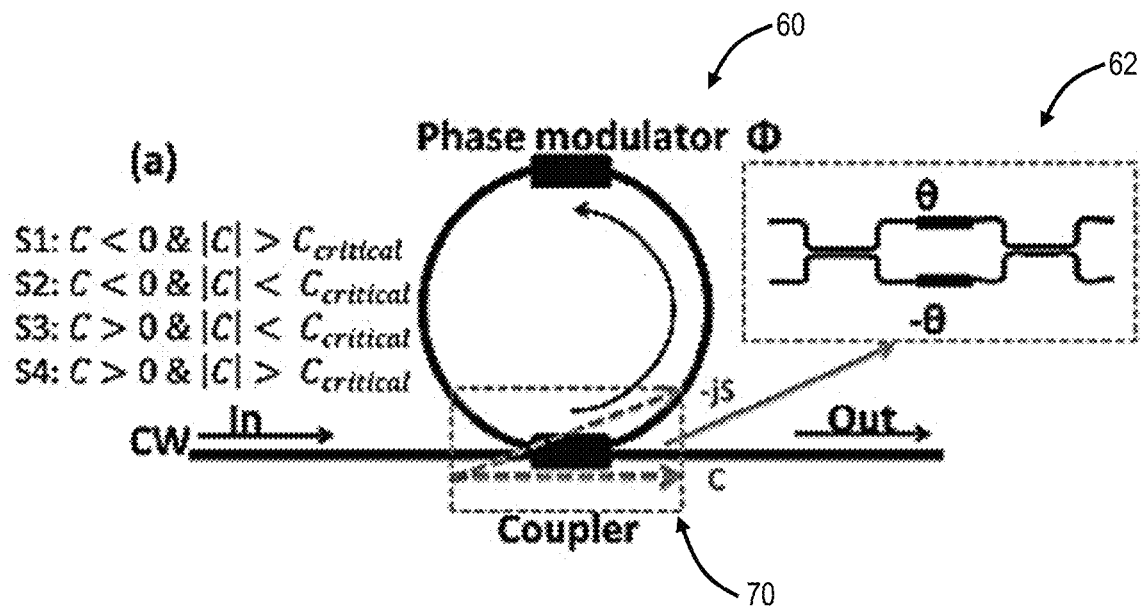
FIG. 7A is an example implementation of an RDM modulator with a tunable coupler based on a four-port Mach-Zehnder Interferometer (MZI) from B. Song, L. Zhuang, C. Zhu, B. Corcoran, and A. Lowery. "Single ring resonator QPSK modulator," CLEO2015, SW1N1.1.
Figure 7B:
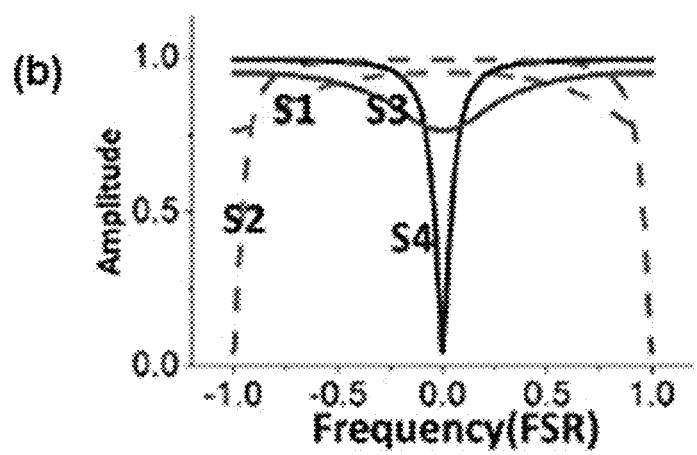
FIG. 7B is a diagram of corresponding amplitude responses for the RDM modulator of FIG. 7A.

FIG. 7A is an example implementation of an RDM modulator 60 with a tunable coupler 62 based on a four-port Mach-Zehnder Interferometer (MZI) 64 from reference [8]. FIG. 7B is a diagram of corresponding amplitude responses for the RDM modulator of FIG. 7A.

Figure 8A:
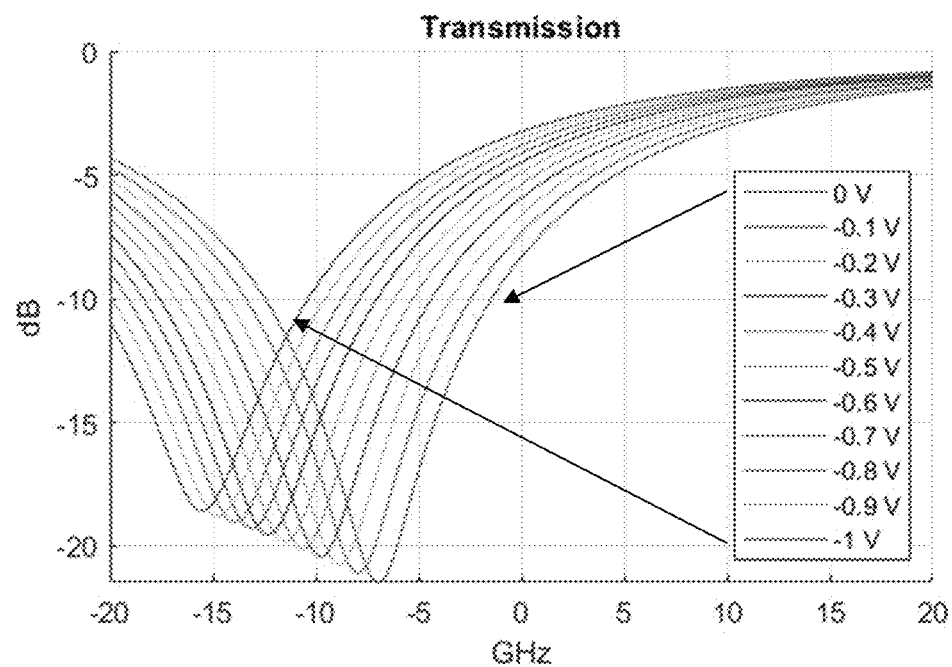
FIG. 8A is a graph of transmission of practical RDM modulator at different drive voltages.
Figure 8B:
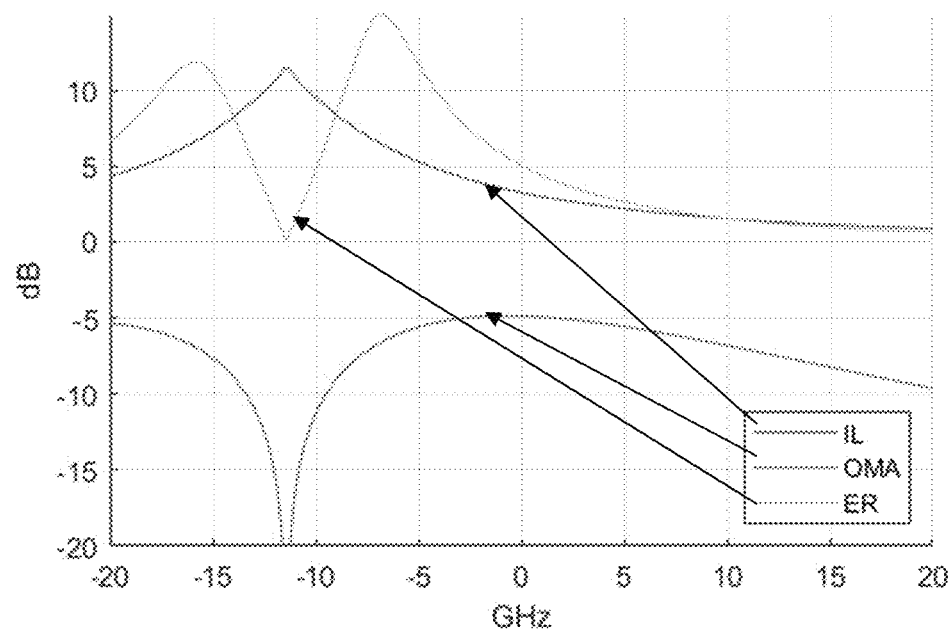
FIG. 8B is a graph of Insertion Loss (IL), Optical Modulation Amplitude (OMA) and Extinction Ratio (ER) for optimized detuning of resonance from the laser line (laser line is at 0 GHz).

FIG. 8A is a graph of transmission of practical RDM modulator at different drive voltages. FIG. 8B is a graph of Insertion Loss (IL), Optical Modulation Amplitude (OMA)

and Extinction Ratio (ER) for optimized detuning of resonance from the laser line (at 0 GHz).

Optical Modulation Amplitude (OMA) is a convenient metric for overall modulator performance and is defined as optical power difference between '1' and '0' levels for NRZ signals, i.e., P1-P0 in linear units (note: it is plotted in dB in FIG. 8B). Insertion loss (IL) is preferentially minimized to reduce link loss budget impact, while extinction ratio (ER) defined as P1/P0 should be kept large.

FIG. 8B shows that a slightly under coupled practical RDM modulator can achieve acceptable levels of OMA (−5 dB), IL (3 dB) and ER (5 dB) under a 0V to −1.0V modulation voltage swing with optimal detuning of resonance from laser line (laser line is at 0 GHz). This all sets the conditions for harmlessly and hitlessly shifting the 'spare' RDM modulator resonance on top of an active one (spectrally), as well as moving away the former active—all with couplers disabled by merely 6 times decrease of coupling coefficient from 0.171 down to under 0.03.

It is possible to first bring a 'spare' RDM modulator in fully operational state by enabling its coupler and then after that removing the originally active RDM modulator from operational state by disabling its coupler, but this would result in unduly repeated Insertion Loss while both RDM modulators are fully operational, but while only first in line of light propagation is contributing the lion's share of modulation. As better alternative, it's possible to do disabling of active RDM's coupler and enabling of spare RDM's coupler simultaneously. Now let's focus on the simultaneous gracious handing-off from one RDM to another for the modulator: the trajectories of their coupling coefficients in time during the handoff. Again, at the receiver, a circuit combines the photocurrents from photodetectors after the drop filter RDMs being swapped on their own. For the transmitter, the effects two RDM modulators are combined while adjusting the couplers 70, following the time trajectories of their coupling coefficients. One of the example trajectories is illustrated in FIGS. 9A and 9B.

Figure 9A:
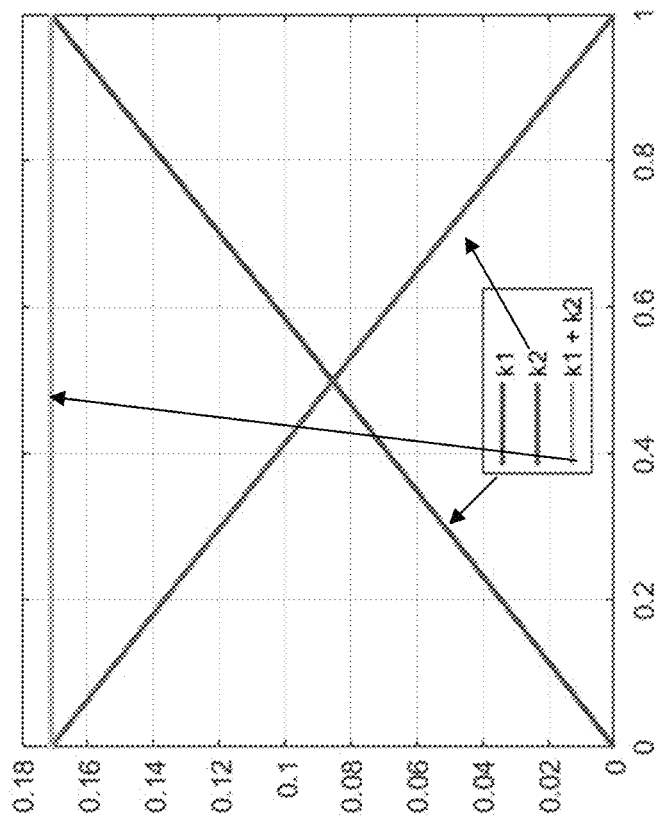
FIG. 9A is a graph of dual serial modulator composite response under linear time evolution of amplitude coupling coefficients.
Figure 9B:
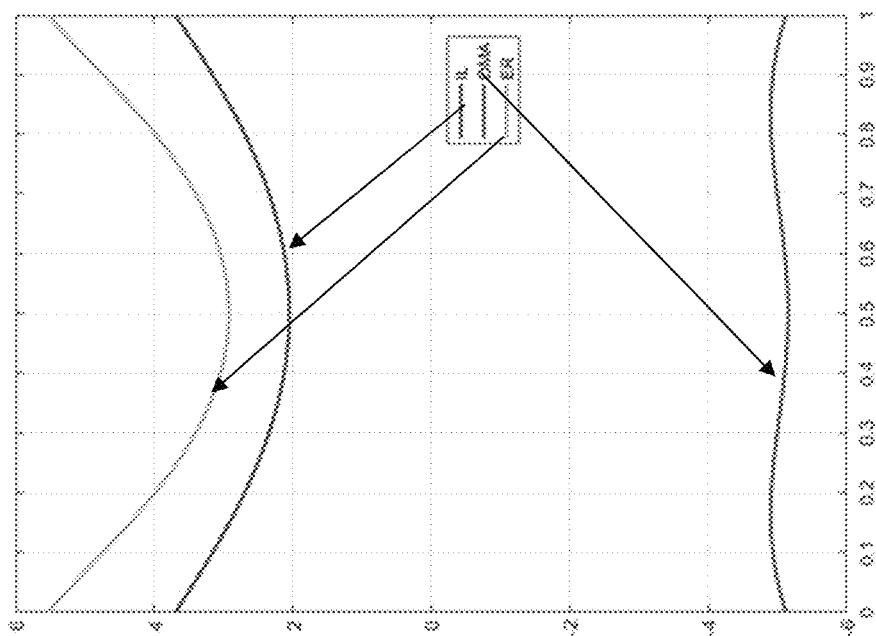
FIG. 9B is a graph of the of two amplitude coupling coefficients. Sum of two amplitude coupling coefficients is constant.

FIG. 9A is a graph of dual serial modulator composite response under linear time evolution of amplitude coupling coefficients. FIG. 9B is a graph of the of two amplitude coupling coefficients which is constant. In this case, amplitude coupling coefficients are evolving linearly in time (time varying from 0 to 1 on abscissae) such that their sum stays constant. Note that the Insertion Loss is actually decreasing in the process of the hand-off in this case.

Figures 10A, 10B:
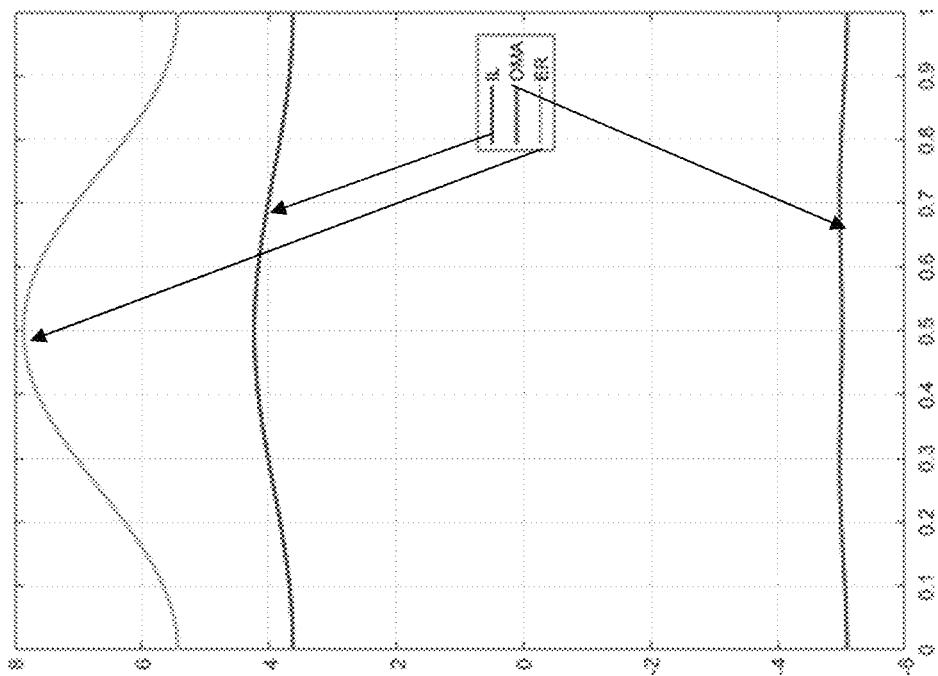
FIG. 10A is a graph of dual serial modulator composite response under Sine/Cosine time evolution of amplitude coupling coefficients.
FIG. 10B is a graph of the of two amplitude coupling coefficients. The sum of two power coupling coefficients remains constant.

FIG. 10A is a graph of dual serial modulator composite response under Sine/Cosine time evolution of amplitude coupling coefficients. FIG. 10B is a graph of the of two amplitude coupling coefficients. In this case, amplitude coupling coefficients are evolving in time as Sine/Cosine such that the sum of power coupling coefficients stays constant. The obvious benefit of the latter exemplary trajectory (FIG. 10B) is that it results in a flatter OMA. It is evident that optimal choice of the evolution trajectories of coupling coefficients in time contributes to the graciousness of the RDM modulator hand-off.

Several aspects need to be considered for proper operation:

Data signals driving RDMs on spare and active channel targeted for replacement have to be matched in time to produce proper modulation addition, with the delay induced by light propagation between the RDMs taken into account.

Similar to the receiver, mechanisms are required to detect spare RDM alignment relative to the channel targeted for replacement.

Of course, coupling ratio control will consume additional power. For an MZI-based coupler, transmission changes from 0.171 to 0.03, i.e., it requires a phase adjustment of 2*(ASIN(0.171)−ASIN(0.03))=0.2837 radian ~π/10. This is a small enough range that could be covered either by thermo-optic or preferentially electro-optic effect, with additional control range required to compensate for Mach-Zehnder Modulator (MZM) manufacturing offsets from nominal.

Further Power Reduction

The above description can include RDM tuning implemented via microheaters using a thermo-optic effect. The advantage of this approach is the microheaters do not need to heat up to the maximum temperature (e.g., 60-80 deg. C.). Rather, the heating only needs to heat between 10-12 deg. C. so that the frequency can be locked on either all of the working RDMs or some of the working RDMs and the spare RDM.

An alternative approach is to use an electro-optic effect for tuning RDM resonance and controlling couplers. These provide extremely low power consumption but with generally limited range, for example, 80 fW/10 GHz tuning with a range of ~100 GHz, see "A Tunable Hybrid III-V-on-Si MOS Microring Resonator with Negligible Tuning Power Consumption," D. Liang, et al., Optical Fiber Comm Conference, OFC 2016, paper Th1K.4, the contents of which are incorporated by reference in their entirety.

Recall that thermal tuning power is ~20 mW/10 GHz, i.e., electro-optic tuning produces $2.5 \cdot 10^8$ power reduction, not accounting for control electronics. A limited tuning range is quite sufficient for this application. Therefore, intrinsic tuning ring power consumption can be reduced to virtually zero, not accounting for control electronics.

Tuning Processes

The RDMs include N working RDMs and one spare RDM. Of course, it is possible to include other numbers, e.g., additional spare RDMs. The key to the present disclosure is to limit the tuning range exploiting the periodicity of the RDMs in frequency. The tuning both on the receiver RDM drop filters and the transmitter RDM modulators is in-service. It is expected that tuning and re-tuning will only occur after major temperature shifts, e.g., 10 deg. C. or more.

Receiver RDM Drop Filter Handoff Process

Figure 11:
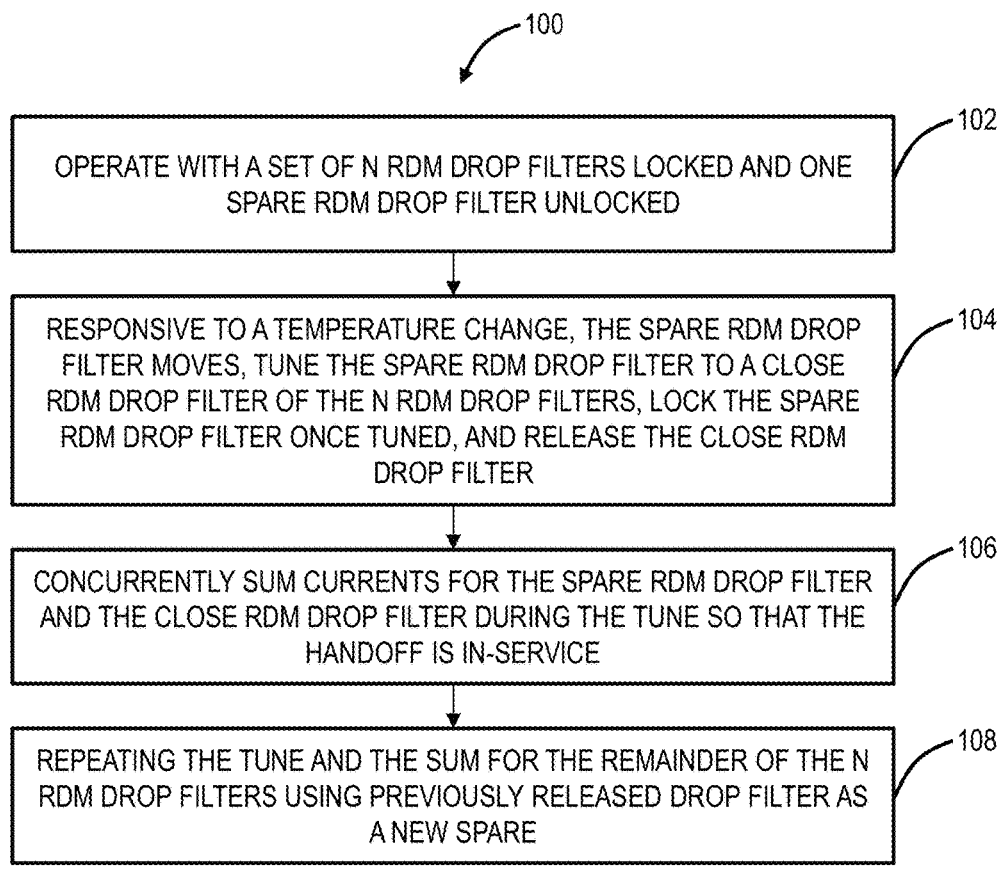
FIG. 11 is a flowchart of a Receiver RDM drop filter handoff process.

FIG. 11 is a flowchart of a Receiver RDM drop filter handoff process 100. The process 100 is implemented in a PIC having N RDM drop filters and at least one spare RDM filter. The process 100 supports graceful and in-service handoff between RDM drop filters to account for temperature variation. Again, as described herein, the present disclosure does not require heating the RDMs to a high temperature that is maintained so the spectral operation can be locked. Instead, the present disclosure allows one of the RDMs to move with respect to its spectral operation, and uses the periodic spectral operation of the RDMs to lock the RDMs so that there is not a need to heat the RDMs over a large range, thereby decreasing power requirements from the conventional approach to heat to the maximum values.

The process 100 includes a PIC operating with a set of N RDM drop filters locked and one spare RDM drop filter unlocked (step 102); responsive to a temperature change, the spare RDM drop filter moves, tuning the spare RDM drop filter to a (spectrally) close RDM drop filter of the N RDM drop filters, locking the spare RDM drop filter once tuned, and releasing the close RDM drop filter (step 104); concurrently summing currents for the spare RDM drop filter and the close RDM drop filter during the tune so that the handoff is in-service (step 106); and repeating the tuning and the summing for the remainder of the N RDM drop filters (step 108) using the previously released drop filter as a new spare. The locking/unlocking and movement is related to spectral operation of the RDM drop filters.

Transmitter RDM Modulator Handoff Process

Figure 12:
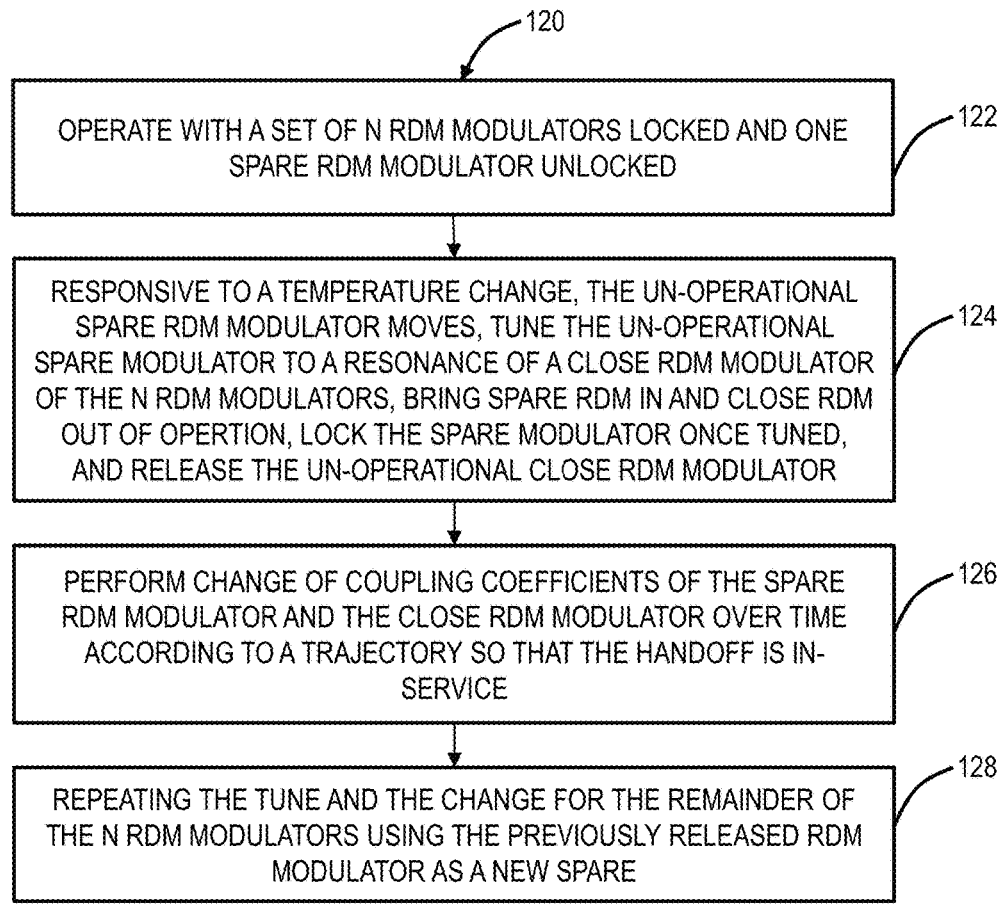
FIG. 12 is a flowchart of a Transmitted RDM modulator handoff process.

FIG. 12 is a flowchart of a Transmitted RDM modulator handoff process 120. The process 120 is implemented in a PIC having N RDM modulators and at least one spare RDM modulator. Similar to the process 100, the process 120 supports graceful and in-service handoff between RDM modulators to account for temperature variation. In an embodiment, a PIC transceiver can support both the processes 100, 120 to reduce power requirements. Of course, the processes 100, 120 can be separate and they do not need to necessarily be used together.

The process 120 includes a PIC operating with a set of N RDM modulators locked and one spare RDM modulator unlocked (step 122). Responsive to a temperature change, the spare RDM modulator moves while in un-operational state by its coupler disabled, tuning the spare modulator to a resonance of a close RDM modulator of the N RDM modulators, locking the spare RDM modulator once tuned, bringing the spare RDM in operation by enabling its coupler and close RDM out of operation by disabling its coupler, and releasing the close RDM modulator while in un-operational state by its coupler disabled (step 124); performing change of coupling coefficients of the spare RDM modulator and the close RDM modulator over time according to a trajectory so that the handoff is in-service (step 126); and repeating the tuning and the changing for the remainder of the N RDM modulators (step 128) using the previously released RDM modulator as a new spare. The locking/unlocking and movement is related to resonance of the RDM modulators.

PIC

In an embodiment, a PIC 20 includes N Ring and Disk type Microstructures (RDMs) 11, 12, 13, 14, 15, N is an integer and greater than 1; at least one spare RDM 20, wherein each RDM 11, 12, 13, 14, 15, 20 operates spectrally in a periodic nature and has its spectral operation vary by temperature; and circuitry configured to handoff any of the N RDMs 11, 12, 13, 14, 15 and the at least one spare RDM 20 for spectral operation based on a current temperature. For the handoff, one of the N RDMs 11, 12, 13, 14, 15 and the at least one spare RDM 20 is unlocked spectrally and is tuned and locked to a frequency of interest of a current RDM based on the temperature, and the current RDM is unlocked. The circuitry configured to handoff can operate in-service.

The N RDMs 11, 12, 13, 14, 15 and the at least one spare RDMs 20 can be drop filters for a receiver. The circuitry configured to handoff includes a summation circuit that sums currents of any two RDMs being in the handoff. The N RDMs 11, 12, 13, 14, 15 and the at least one spare RDMs 20 can be modulators 60 for a transmitter. The circuitry configured to handoff can include a coupler 70 that has trajectories of its coupling coefficients modified during the handoff. The PIC can further include circuitry configured to implement electro-optic tuning. The PIC can be integrated with another circuit for optical Input/Output (IO). Each of the RDMs can have a free spectral range greater than the spectral operation.

Handoff Process

Figure 13:
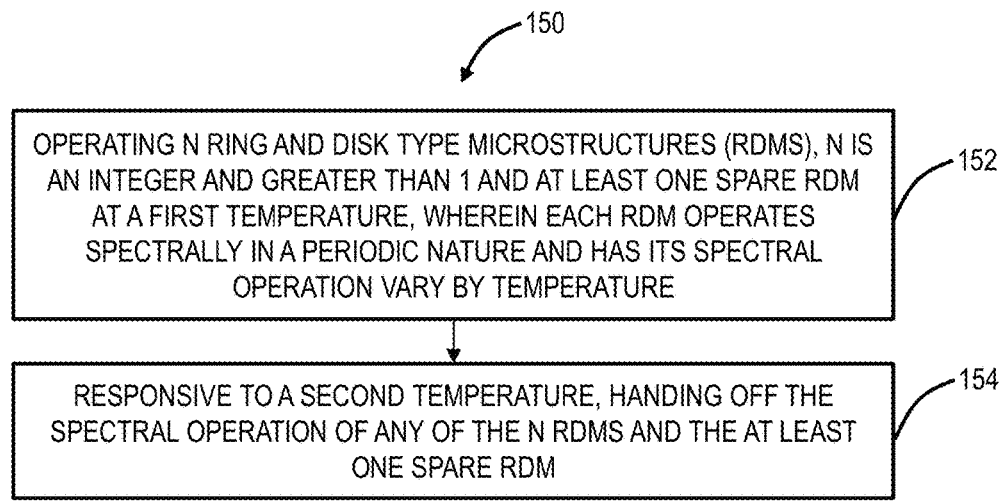
FIG. 13 is a flowchart of a process of handoff for Ring and Disk type Microstructure (RDM) spectral operation.

FIG. 13 is a flowchart of a process 150 of handoff for Ring and Disk type Microstructure (RDM) spectral operation. The process 150 includes operating N Ring and Disk type Microstructures (RDMs), N is an integer and greater than 1 and at least one spare RDM at a first temperature, wherein each RDM operates spectrally in a periodic nature and has its spectral operation vary by temperature (step 152); and, responsive to a second temperature, handing off the spectral operation of any of the N RDMs and the at least one spare RDM (step 154).

The handing off can include unlocking spectrally the one of the N RDMs and the at least one spare RDM; tuning and locking the one of the N RDMs and the at least one spare RDM to a frequency of interest of a current RDM; and unlocking spectrally the current RDM. The handing off can be in-service.

The N RDMs and the at least one spare RDMs can be drop filters for a receiver. The handing off, for the drop filters, can include summing currents of any two RDMs being in the handing off. The N RDMs and the at least one spare RDMs can be modulators for a transmitter. The handing off, for the modulators, can include modifying trajectories of coupling coefficients. The handing off can include electro-optic tuning. The N RDMs and at least one spare RDM can be integrated with another circuit for optical Input/Output (IO). Each of the RDMs can have a free spectral range greater than the spectral operation.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Photonic Integrated Circuit (PIC) comprising:
   N Ring and Disk type Microstructures (RDMs), N is an integer and greater than 1;
   at least one spare RDM, wherein each RDM operates spectrally in a periodic nature and has its spectral operation vary by temperature, wherein the N RDMs and the at least one spare RDMs are drop filters for a receiver; and
   circuitry configured to handoff, in-service and hitless for an associated channel in the handoff, any of the N RDMs and the at least one spare RDM for spectral operation based on a current temperature, wherein, for the handoff, a cascading tuning is performed wherein the at least one spare RDM is unlocked spectrally and electro-optically or thermo-optically tuned and locked to a frequency of interest of a current RDM based on the temperature, and the current RDM is unlocked, wherein the circuitry configured to handoff includes a selectable photocurrent summation circuit that sums currents of any two RDMs being in the handoff for in-service operation.

2. The PIC of claim 1, wherein the PIC includes a transmitter and wherein the N RDMs and the at least one spare RDMs are modulators for the transmitter.

3. The PIC of claim 2, wherein the circuitry configured to handoff includes a coupler that has its coupling coefficients with respect to time modified during the handoff following prescribed trajectories for in-service operation.

4. The PIC of claim 1, wherein the PIC is integrated with another circuit for optical Input/Output (IO).

5. The PIC of claim 1, wherein each of the RDMs has a free spectral range greater than the spectral operation.

6. The PIC of claim 1, wherein each RDM is individually controlled, locked, and unlocked.

7. The PIC of claim 1, wherein the at least one spare RDM is one spare RDM and each RDM has a Free Spectral Range (FSR) just larger than a total channel spectral coverage.

8. A method of handoff for Ring and Disk type Microstructure (RDM) spectral operation, the method comprising steps of:
   operating N Ring and Disk type Microstructures (RDMs), N is an integer and greater than 1 and at least one spare RDM at a first temperature, wherein the N RDMs and the at least one spare RDMs are drop filters for a receiver, wherein each RDM operates spectrally in a periodic nature and has its spectral operation vary by temperature wherein, for the handoff, a cascading tuning is performed wherein the at least one spare RDM is unlocked spectrally and electro-optically or thermo-optically tuned and locked to a frequency of interest of a current RDM based on the temperature, and the current RDM is unlocked; and
   responsive to a second temperature, handing off, in-service and hitless for an associated channel in the handing off, the spectral operation of any of the N RDMs and the at least one spare RDM, wherein the handing off includes summing currents of any two RDMs being in the handing off for in-service operation.

9. The method of claim 8, wherein the handing off includes
   unlocking spectrally the at least one spare RDM;
   tuning and locking the at least one spare RDM to a frequency of interest of a current RDM; and
   unlocking spectrally the current RDM.

10. The method of claim 8, wherein the method further includes a transmitter and wherein the N RDMs and the at least one spare RDMs are modulators for the transmitter.

11. The method of claim 10, wherein the handing off includes modifying coupling coefficients following prescribed trajectories for in-service operation.

12. The method of claim 8, wherein the handing off includes electro-optic tuning.

13. The method of claim 8, wherein the N RDMs and at least one spare RDM are integrated with another circuit for optical Input/Output (IO).

14. The method of claim 8, wherein each of the RDMs has a free spectral range greater than the spectral operation.

* * * * *